Aug. 14, 1962 R. B. BELSER ET AL 3,048,912

METHOD OF FORMING A STABLE ALUMINUM PLATED QUARTZ RESONATOR

Filed June 3, 1960

INVENTOR,
RICHARD B. BELSER
WALTER H. HICKLIN.

BY Harry M. Saragovitz

ATTORNEY

United States Patent Office 3,048,912
Patented Aug. 14, 1962

3,048,912
METHOD OF FORMING A STABLE ALUMINUM PLATED QUARTZ RESONATOR

Richard B. Belser, Atlanta, and Walter H. Hicklin, Fulton, Ga., assignors to the United States of America as represented by the Secretary of the Army
Filed June 3, 1960, Ser. No. 33,870
2 Claims. (Cl. 29—25.35)

This invention relates to the formation of piezoelectric crystals and in particular, to a method of forming stable overtone quartz crystal resonators using aluminum as a plating material.

Although aluminum has been considered as a plating for low frequency crystal units, the utilization of aluminum as a coating material for resonators suitable for overtone operation at shear frequencies up to 250 mc./sec. has not proved entirely satisfactory. Manufacturing techniques heretofore used, for making aluminum plated overtone resonators, produced units that showed erratic behavior and had undesirable frequency stability.

An object of the present invention is to provide a method for producing aluminum plated resonators having improved frequency stability.

This invention contemplates the formation of highly stable resonators by evaporating aluminum onto a quartz substrate which has been preheated in a vacuum to about 450° C. and cooled to about 250° C., mounting the plated resonator in a container and baking out at about 180° C. in a vacuum for a period of about two to three hours before sealing the container.

Figure 1:
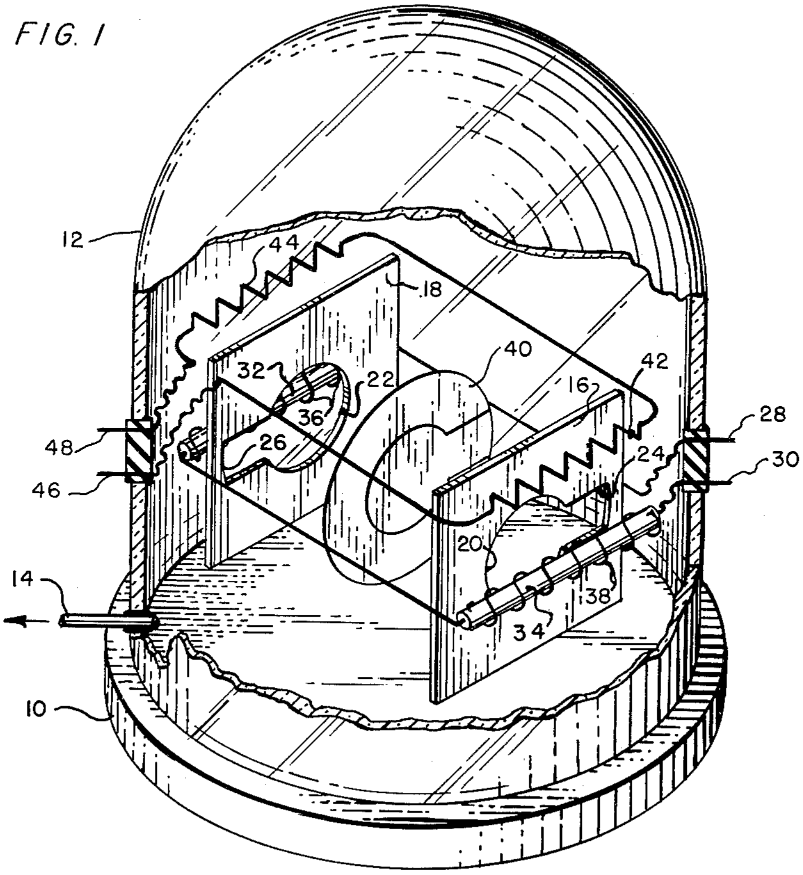
Figure 2:
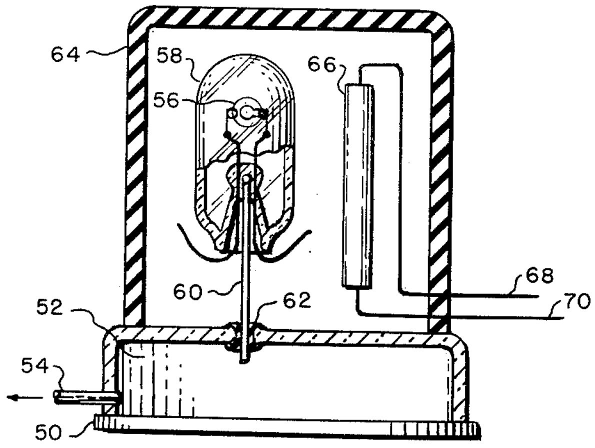

For a more detailed description of the invention, together with other and further objects thereof, reference is had to the following description taken in connection with the accompanying drawing, wherein:

FIG. 1 is a perspective view, partly cut-away, of a vacumm chamber for coating both sides of a quartz resonator simultaneously by evaporation; and FIG. 2 is a perspective view, partly cut-away, of another vacuum chamber for evacuation and bakeout of a quartz resonator.

Suitable apparatus forming no part of the invention and which may be employed in carrying out the invention are illustrated in FIGS. 1 and 2.

The plating function is shown in FIG. 1. The apparatus shown in FIG. 1 of the drawing comprises a vacuum chamber formed by a base member 10 having a removable shell 12 and maintained under vacuum by means of an exhaust conduit 14 connected to a suitable source of vacuum, not shown. Positioned in the vacuum chamber are a pair of spaced baffle plates 16 and 18 which have centrally located apertures 20 and 22 therein, the apertures having a generally circular configuration with radially extended notches 24 and 26. The supports for the various parts in the chamber are not shown in the drawing.

A source of heating current not shown, is connected by leads 28 and 30, in series electrical circuit, to filaments 32 and 34. These filaments are of the type generally used in evaporating apparatus and are spaced from baffle plates 16 and 18, and accommodate small pieces of aluminum 36 and 38, respectively, to be vaporized. A bare AT-cut quartz crystal 40 is mounted between baffle plates 16 and 18, and in this position is aligned with the centers of the apertures 20 and 22 therein, the aluminum carrying filaments 32 and 34 being also aligned with the apertures and the quartz crystal and being in vapor deposition range of said crystal. In order that the quartz crystal 40 may be contained at the proper temperature during vapor deposition, auxiliary radiation heaters 42 and 44 are conveniently spaced on either side of the crystal and are similarly supplied with current through leads 46 and 48. The leads 28, 30, 46 and 48 and conduit 14 will normally enter the vacuum chamber through the base 10 thereof, and they have been shown to enter the chamber through the glass portion merely for reasons of simplicity and clarity of illustration.

The bakeout function is shown in FIG. 2 which shows a vacuum chamber comprising a base 50 mounting a shell 52 having therein a port 54 by way of which the chamber may be evacuated. Positioned externally above shell 52 is a unit comprising an aluminum plated resonator 56 in a glass container 58 having an open seal-off tube 60 extending into shell 52 through a rubber stopper 62 hermetically sealed thereto. Disposed over container 58 is a demountable oven 64 to maintain resonator 56 at the proper temperature during bakeout. Oven 64 is provided with a radiation heater 66 which is supplied with current through leads 68 and 70. The glass container 58 may be sealed off with a conventional gas-oxygen flame on removal of oven 64 after the bakeout.

The quartz crystal is treated in the typical plating setup as shown in FIG. 1 by carrying out the following steps: The bare quartz crystal 40 is mounted into the operating position between plates 16 and 18 and the pressure in the chamber is dropped into the range preferably about $5 \times 10^{-5}$ millimeters of mercury or less. Crystal 40 is preheated by radiation heaters 42 and 44 to a temperature within the range of 400° C. to 500° C., and then cooled to a curing temperature ranging between 175° C. to 300° C. Aluminum is then evaporated onto both sides of crystal 40 simultaneously from the aluminum carrying filaments 32 and 34.

That portion of the aluminum vapor which goes through apertures 20 and 22 is deposited on the two large surfaces of crystal 40 in a pattern determined by the configuration of the apertures. The configurations are such that a layer of aluminum from filament 34 is deposited on the side of the crystal, visible in the drawing, in the form of a generally circular area with a strip extending to the right therefrom. Aluminum from filament 32 is deposited on the other side of crystal 40 to form a similar shape, but with the strip extending in a direction opposite from the first strip. These strips, as indicated below, are utilized to secure conventional spring clips to the crystal.

Following the deposition of the aluminum material, the plated crystal 40 is removed from the vacuum chamber, mounted with the usual spring clips and enveloped in a glass container having an open seal-off tube. The unit is mounted in the second vacuum chamber as shown in FIG. 2. The pressure is dropped lower than $5 \times 10^{-5}$ millimeters of mercury and the bakeout temperature is maintained within the range of 150° C. to 250° C. for a period up to 3 hours, following which the glass container 58 is tipped off and sealed in vacuum, by conventional methods.

It is believed that evaporation of the aluminum in vacuum onto the quartz crystal cooled to the curing temperature allows the metal atoms to arrange their lattice in a manner similar to that of metal crystallizing from a melt. Hence, it is found that the grain size of the metal is larger and the film is more free of strains and imperfections. Its absorptive ability is moreover, decreased; this is a desirable objective and influences, decidedly, resonator frequency fluctuation. However, curing temperatures higher than 300° C. causes the aluminum to oxidize excessively, while temperatures lower than 175° C. results in insufficient crystallite growth in the aluminum film. Either of these conditions result in greater absorptivity by the film electrodes. Furthermore, it was found that any stress developed in the plated coat on the quartz crystal is apparently annealed out during the bakeout step.

A group of AT-cut quartz crystal resonators of high stability were fabricated by preheating the crystal to a temperature of about 450° at a pressure lower than $5\times10^{-5}$ millimeters of mercury, then cooling the crystal to a temperature of about 250° C., and evaporating aluminum thereon by vapor deposition, simultaneously on both major surfaces of the crystal. The coated crystal was removed from the vacuum chamber and mounted in a glass container having an open seal-off tube. Then the unit comprising the container and the plated crystal was baked out at about 180° C. for a period between two to three hours at the above mentioned pressure, and finally the container was tipped off in the evacuated condition. These units maintained their original frequency within one part per million over a period of twelve months, and there appears to be no reason to suggest that they could not maintain similar stability indefinitely. The method, thus enables and facilitates the economic fabrication of aluminum plated resonators of desirable and reproducible physical and performance characteristics.

While there has been described what is at present considered a preferred embodiment of the invention, it will be obvious to those skilled in the art that various changes and modifications may be made therein without departing from the invention, and it is therefore aimed in the appended claims to cover all such changes and modifications as fall within the spirit and scope of the invention.

What is claimed is:

1. The method of forming a highly stable quartz crystal resonator comprising the steps of preheating a quartz crystal to a temperature in the range of 400° C. to 500° C. at a pressure lower than $5\times10^{-5}$ millimeters of mercury, cooling said crystal to a temperature of between about 175° C. and about 300° C., then vapor depositing aluminum on same, removing the coated crystal from said vacuum atmosphere, mounting said coated crystal in a container having an open seal-off tube, subjecting said container to the aforesaid vacuum pressure, baking said coated crystal in said container at a temperature substantially within the range from 150° C. to 250° C. for a period up to three hours, and thereafter sealing said container to maintain said vacuum pressure therein.

2. The method of forming a highly stable quartz crystal resonator comprising the steps of preheating a quartz crystal to a temperature of about 450° C. at a pressure lower than $5\times10^{-5}$ millimeters of mercury, cooling said crystal to a temperature of about 250° C., then vapor depositing aluminum on same, removing the coated crystal from said vacuum atmosphere, mounting said coated crystal in a container having an open seal-off tube, subjecting said container to the aforesaid vacuum pressure, baking said coated crystal in said container at a temperature of about 180° C. for a period between two to three hours, and thereafter sealing said container to maintain said vacuum pressure therein.

References Cited in the file of this patent

UNITED STATES PATENTS

| | | |
|---|---|---|
| 1,848,893 | Lavallee | Mar. 8, 1932 |
| 2,765,765 | Bigler et al. | Oct. 9, 1956 |